Figure 1:
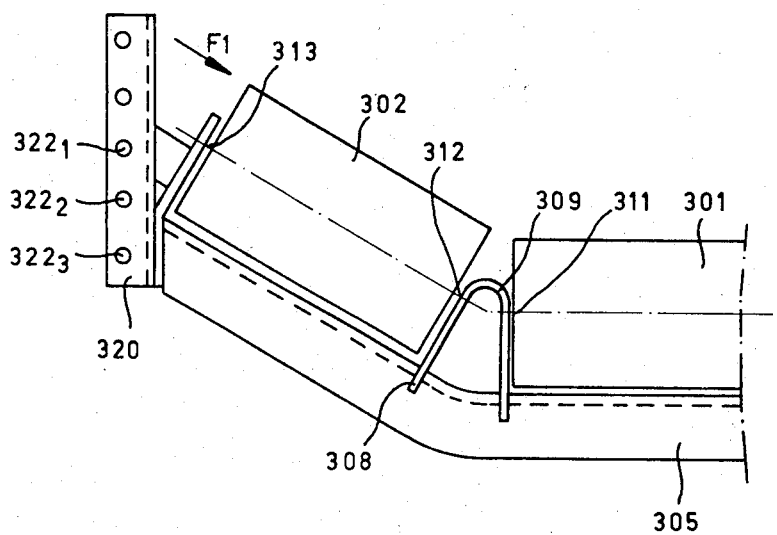

Dec. 5, 1967   J. LANTZ   3,356,206
DEVICE FOR TRANSPORTING MATERIALS
Filed Feb. 3, 1966   4 Sheets-Sheet 1

Inventor:
Jean Lantz
By Robert E. Burns
Atty.

Dec. 5, 1967   J. LANTZ   3,356,206
DEVICE FOR TRANSPORTING MATERIALS
Filed Feb. 3, 1966   4 Sheets-Sheet 3

Inventor:
Jean Lantz
By Robert E. Burns
Atty.

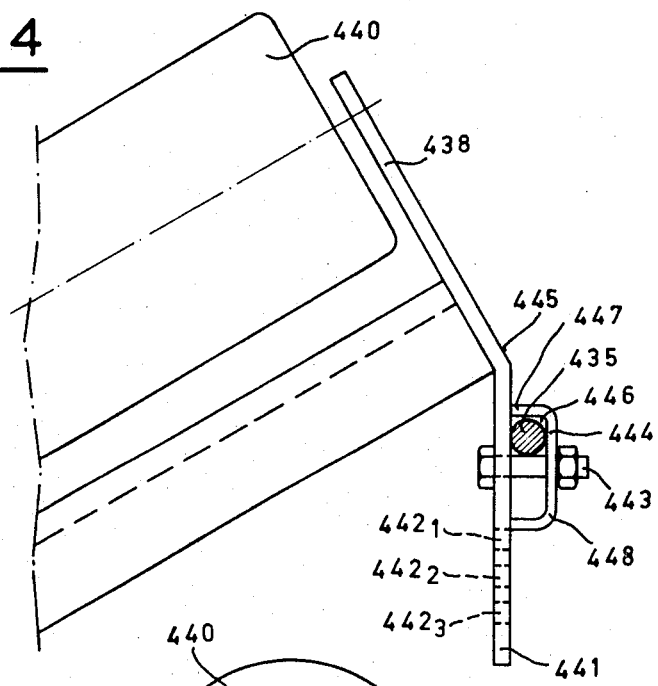
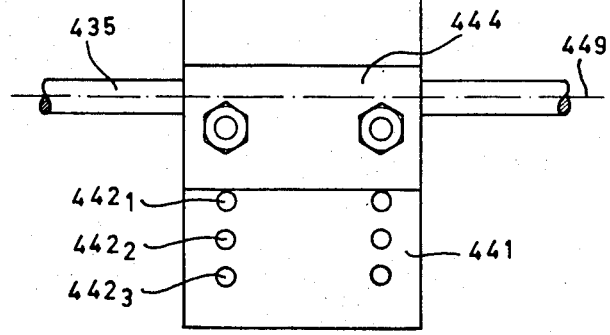

United States Patent Office 3,356,206
Patented Dec. 5, 1967

3,356,206
DEVICE FOR TRANSPORTING MATERIALS
Jean Lantz, Saverne, France, assignor to Societe Precismeca, Saverne, France, a French company
Filed Feb. 3, 1966, Ser. No. 524,714
Claims priority, application France, Feb. 4, 1965, 4,407, 4,408; Feb. 5, 1965, 4,574; Jan. 7, 1966, 45,152
2 Claims. (Cl. 198—192)

This invention relates to a device for transporting materials.

It is already known to use conveyor belts to transport bulk materials. It is usual for these belts to be continuous and to be provided with a rigid frame.

In the same fashion in order to transport materials from one level to the other in a warehouse, it is necessary to use elevators.

These elevators can be either of the bucket type or of the gravity-discharge elevator type.

These different devices have various disadvantages and in particular in order to avoid severe bending of the conveyor, the framework must be made of sections of a fairly large thickness. Thus the conveyor is heavy which often presents a disadvantage for the installation of a handling complex having such a conveyor.

The framework being rigid requires levelling the ground on which it lies and it is thus not always possible to use an empty lot for a conveyor with rigid framework without a receiving system.

Similarly for lifts, the motor means must be very powerful since it must not only bear the weight of the material but also that of the buckets, the platforms, the chains, etc. Additionally, the discharge of an elevator is very irregular in as much as the emptying occurs suddenly.

The present invention has for its object to obviate these disadvantages and provides a device for transporting materials comprising conveyor means adapted to receive and convey the material, and at least one elastic suspension cable supported at at least two points along its length, the conveyor means being suspended from the cable between said two points. This construction provides a robust device in which shocks emitted by the transported material are absorbed by the inherent elasticity of the cable thus avoiding the wear of the transport members such as rollers, belts and support frames.

Preferably the conveyor means comprises a belt movably mounted on a plurality of rollers, the rollers being suspended from the cable.

According to the preferred embodiment of the invention, a plurality of pendular posts are distributed along the length of the cable and ensure the support thereof and the steady support of the weight of the transported materials.

Preferably a hinged joint at the base of the pendular posts promotes the flexibility of the cable and avoids breakage of the cable as a result of shock given to the installation by the transported materials.

The suspension element can be flexibly mounted on the work cable, which permits considerable play for the transport members on the said cable and renders flexible the transport of products on the belt placed on the rollers.

In another embodiment of the invention, the upper station comprises means for regulating the height of the cradle comprising lateral frames provided with a plurality of openings, these openings serving to house a securing element uniting the cradle to a suspending means.

In another embodiment of the invention the side rollers are mounted out of the axis in the sense of direction of the conveyor belt, which ensures the centring of said conveyor belt.

According to another embodiment of the invention, the different rollers supporting the conveyor are mounted adjustably, which permits a uniform surface of the belt to be obtained during its unwinding as well as uniformity in the by-passing of the stations supporting the train of rollers thus avoiding the shocks being transmitted to the transported products when passing the station.

According to another embodiment of the invention, regulating elements are interposed between the rollers and the cables forming the framework, which permits to position in the same line all the trains of the rollers, in particular the upper trains, and to avoid that the rollers occupy a permanent position risking to provoke premature wear of the conveyor belt.

According to another embodiment of the invention, the control element comprises a plate serving as link element between the rollers of the upper train and the longitudinal cables forming the train-work of the belt which permits to unite the different trains of the upper rollers to cables and to obtain a conveyor in operating condition.

According to another embodiment, the stations are positioned at intervals in order to strengthen the installation along the different points of its travel, for example by cutting out long uninterrupted straight lines.

According to another embodiment, a retaining cable passing through the opening provided in the lower part of the cross-bars and passing through gripping sleeves positioned along the openings maintains the stations in a vertical position preventing these stations from occupying an oblique position harmful to the proper functioning of the conveyor under the effect of the rectilinear movement of the belt.

According to another embodiment, a plurality of openings pierced in the core of the suspending elements, permits to lengthen or shorten the space located between the axis of the central roller and the upper stations and the cable axis, thus permitting, after having charged the conveyor belts, to place the belts in a rectilinear position.

According to another embodiment, a frame mounted at one of the extremities of the suspending organs holds captive, by means of its two branches, the end of the roller shaft and, in combination with an axis making the frame unitary with the roller, serves as an articulating element to the mobile element.

According to another embodiment, a bent wing of the suspending organ permits to hook the upper garland of the framework formed by longitudinal cables and to make the upper rollers unitary with the cables.

According to another embodiment, a shackle secured by a threaded axis to the end link of the suspending chain engages an opening provided in a linking element unitary with the framework of the station, which makes the substations unitary with the suspending chain.

According to another embodiment, a frame the two branches of which hold the end link of suspending chain in combination with a securing element such as a bolt, suspends the intermediate station.

According to another embodiment, the external supports of the marginal rollers comprise a fold line keeping the end of the support away from the roller which permits to eliminate all friction between the roller and the end support.

According to another embodiment a plurality of openings are provided at the lower end of the hook, which permit, by moving a securing element to regulate the height of the upper train of rollers to vary the space between the axis of the side rollers and the axis of the longitudinal cables.

According to another embodiment, a support member held against the external face of the hook by a securing element, such as a bolt or others, grip the longitudinal cable which prevents a sliding of the train of the upper rollers which would impede the good functioning of the conveyor.

Figure 3:
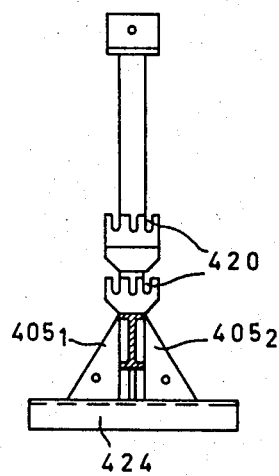
Figure 1A:
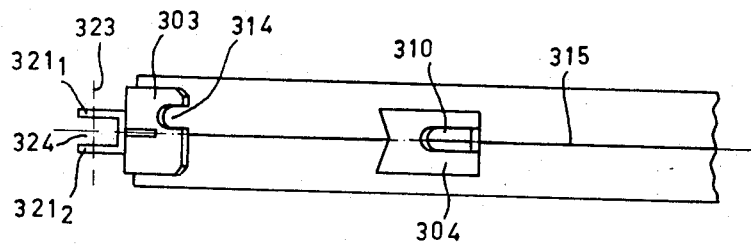
Figure 1B:
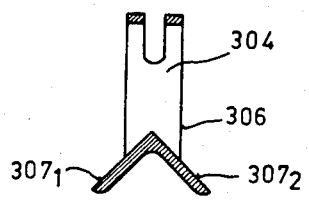
Figure 1C:
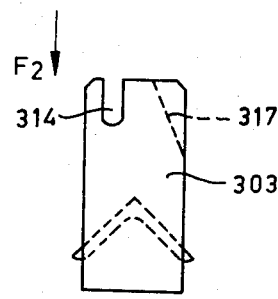
Figure 1D:
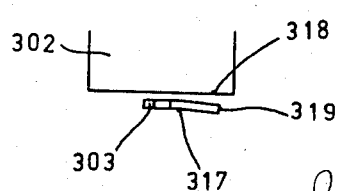
Figure 2:
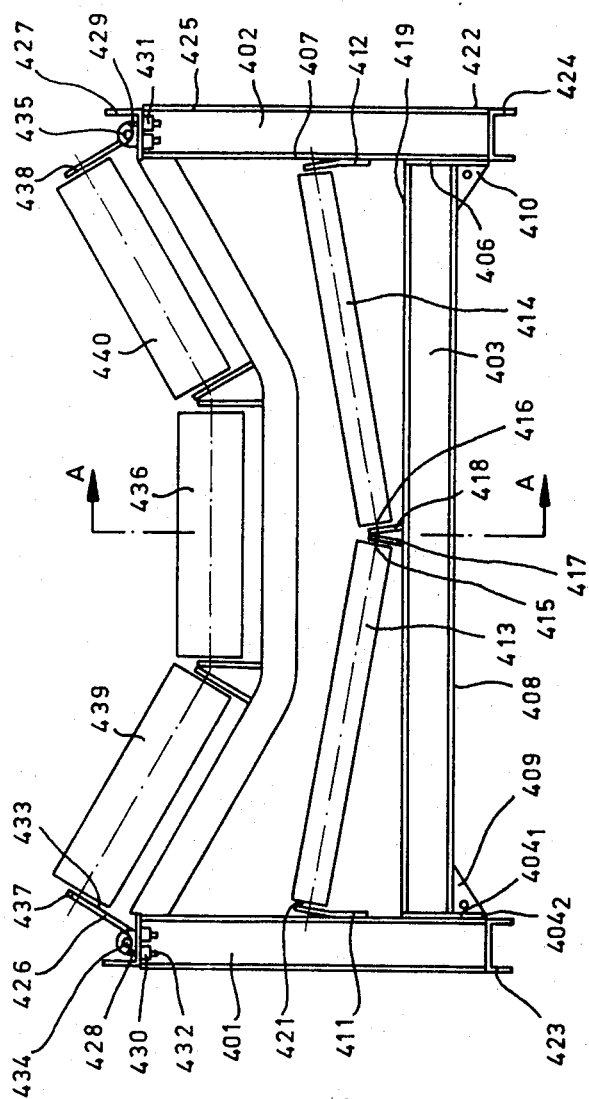

A conveyor in accordance with the invention is represented by way of non-limiting example in the annexed drawings wherein:

FIGURE 1 shows part of an upper station;
FIGURE 1a shows an upper view of the cradle;
FIGURE 1b shows a view taken along section aa of FIGURE 1;
FIGURE 1c shows a view along arrow $F_1$ of FIGURE 1;
FIGURE 1d shows a view taken along arrow $F_2$ of FIGURE 1c.
FIGURE 2 shows the station supporting the train of lower rollers and the suspension cables;
FIGURE 3 shows a view taken along line A—A of FIGURE 2 of the intermediate station;
FIGURE 4 shows the securing of the train of upper rollers;
FIGURE 5 shows a side-view of the same securing.

Referring now to FIGURES 1–1d, the upper station comprises, in accord with the invention, a plurality of rollers supporting the conveyor belt. The central part of the belt moves on a central roller 301. The side rollers 302 keep up the sides of the belt and give it a trough shape. This increases the capacity of the belt.

Rollers 301 and 302 are maintained in place by supports 303 and 304 on a rigid cradle 305. The rigid cradle 305 is made of angle iron and the lower part 306 of the supports mount the outside faces $307_1$ and $307_2$ of said angle iron 305. The supports 304 are secured by suitable means, preferably by welding, to cradle 305.

The ends 308 of the central supports 304 are bent back so that the central supports 304 can serve on the one hand as supports for the central roller 301 and on the other to the side rollers 302.

The bent back part 309 of the central support 304 comprises an elongated opening 310 in which is placed the flat part of the end shaft 311 of central roller 301 and the flat end of shaft 312 of side roller 302.

The end shafts 313 of side rollers 302 are mounted in lateral supports 303 provided with an elongated opening 314. However, this opening 314 is not in the longitudinal axis 315 of cradle 305 but displaced in the sense of direction of conveyor belt. By this means, the side rollers 302 ensure the centering of the belt and avoid the mishandling of the transported materials.

The side supports 303 comprise a fold line 317. The end of the side supports 303 is then spaced apart from side roller 302. Owing to their oblique position, the marginal rollers 302 have a tendency to move away from the centre and the bracket 318 of the roller 302 comes to rub against the inside base 319 of the support 303. The fold line 317 removes all contact between the movable bracket 318 of the marginal roller 302 and the inside face 319 of the fixed side supports 303.

The cradle 305 has blocks 320 at its lateral ends. The branches $321_1$ and $321_2$ of blocks 320 are provided with a plurality of openings $322_1$, $322_2$ and $322_3$. These openings serve as a housing for a securing element 323. This securing element 323 makes unitary a suitable suspension means 324 with cradle 305 of the upper station.

To make the link block 320-cradle 305 rigid, gussets 325 are mounted between the two elements 305 and 320.

FIGURES 2–5 show an improved conveyor according to the invention. Referring first to FIGURES 2 and 3; the lower train of rollers rests on a frame formed of metal sections. This frame comprises of two side uprights 401 and 402 linked by a cross-bar 403. The said cross-bar is made unitary with lateral uprights 401 and 405 by gussets $404_1$, $404_2$ and $405_1$, $405_2$. The gussets 404 and 405 increase the contact surface between the block 406 of the cross-bar 403 and the side face of uprights 401 and 402.

To avoid bending of the cross-bar 403, there are also provided under the lower face 408 of cross-bar 403 gussets 409 and 410, which permit the obtaining of a rigid frame. On the side faces 407 of the uprights 401 and 402 are secured by suitable means supports 411 and 412 which maintain in place the different rollers 413 and 414 making up the lower train. The lower rollers 413 and 414 are maintained at their extremities 415 and 416 by supports 417 and 418 integral with the upper face 419 of cross-bar 403.

The different supports 411, 412 and 417, 418 comprise a plurality of grooves 420. In these grooves 420 is disposed the ends of shaft 421 of rollers 413 and 414. By means of said grooves 420, it is possible to move laterally, that is in the direction of the functioning of the conveyor belt, rollers 413 and 414, which permits the guiding of the return section of the conveyor belt, and avoids during functioning of the conveyor, a misalignment of the conveyor belt outside its axis, which would cause a premature wear of the belt.

To the lower part 422 of uprights 401 and 402, are mounted sections 423 and 424 serving as securing elements to the station. These securing elements 423 and 424 permit the anchoring of the conveyor on the foundation provided therefor or directly to the ground. There is also the possibility of suspending the conveyor belt by supports 426 and 427 by providing the upper part 425 of uprights 401 and 402 with supports 426 and 427. The supports 426 and 427, their wings turned outwardly, are provided with an opening which permits to suspend the conveyor by a rope, a chain or any other suspension element to the ceiling of cornices. On these supports 426 and 427 are secured cable-gripping means 428 and 429. These cable-gripping means 428 and 429 are maintained in place by screws 430 and 431 mounted on the threaded ends 432 of cable-gripping means 428 and 429.

Through opening 433 of the cable-gripping means 428 and 429 are passed cables 434 and 435 serving as the frames for the conveyor. To these longitudinal cables 434 and 435 are secured trains of upper rollers 436.

In the modification shown in FIGURES 4 and 5 lateral supports 437 and 438 are provided supporting the end rollers 439 and 440 of the upper train. Each support 437 and 438 has a side plate 441 provided with a plurality of openings $442_1$, $442_2$, $442_3$ etc. Through these openings 442 is passed a securing element 443. Said securing element 443 maintains a stirrup piece 444 against the outer face 445 of the side plate 441. The longitudinal cables 434, 435 are disposed in the free space 446 between the upper inside face 447 of the stirrup piece 444, the inside face 448 of stirrup piece 444, the outer face 445 of the side plate 441 and the securing element 443.

The plurality of openings $442_1$, $442_2$, $442_3$ etc. permits to adjust the height of the upper train of rollers, which permits to give to the assembly of trains of the conveyor a rectilinear alignment. In effect by lowering the securing device, that is by moving the stirrup piece 444 the distance can be increased between axis 449 of roller 439 or 440 and axis 450 of longitudinal cable 434 or 435.

It will be understood that the invention is not limited to the exemplary embodiments described above and shown in the drawings. The scope of the invention is defined by the appended claims.

What is claimed is:

1. Device for transporting materials comprising a plurality of spaced stations, each station including, in combination, a frame consisting of two side uprights having inner faces connected by a cross-bar having an upper and a lower surface; a plurality of gussets under said cross bar to increase the rigidity thereof; a side support on the inner face of each upright at a point higher than said cross-bar; central support means integrally secured on said upper face of said cross-bar; a pair of lower rollers, one extremity of each roller being supported by one of said side supports and the other extremity by said central support means; said rollers being thus given an approximate V-shape; securing means mounted under said uprights for positioning said station on the ground, a trough-shaped cradle having extremities secured to the upper part of said uprights and spanning said uprights; a pair of intermediate supports on said cradle; mutually inclined lateral supports mounted atop said uprights, an upper train of rollers comprising end rollers and central rollers supported by said intermediate rollers and said lateral supports; means secured to said lateral supports for suspending said uprights.

2. Device according to claim 1, wherein said lateral supports each comprise a lower side plate provided with a plurality of openings, and an adjusted stirrup piece defining therebetween a free space for passing therethrough a suspending cable, said supports each having a securing element for selectively positioning said stirrup with respect to said plate by passing through one of said openings for adjusting the height of said upper train of rollers.

References Cited

UNITED STATES PATENTS

| | | | |
|---|---|---|---|
| 2,766,076 | 10/1956 | Saxe | 198—192 X |
| 2,922,512 | 1/1960 | Lo Presti | 198—192 |
| 2,927,681 | 3/1960 | Moon | 198—192 X |
| 3,062,360 | 11/1962 | Arnot et al. | 198—192 X |
| 3,105,588 | 10/1963 | Long | 198—192 |
| 3,144,235 | 8/1964 | Reilly | 198—192 X |
| 3,191,761 | 6/1965 | Reilly | 198—192 X |
| 3,198,318 | 8/1965 | Brown | 198—192 |
| 3,241,655 | 3/1966 | Lo Presti | 198—192 |

FOREIGN PATENTS 1,376,984   9/1964   France.

EVON C. BLUNK, *Primary Examiner.*

SAMUEL F. COLEMAN, *Examiner.*

M. L. AJEMAN, *Assistant Examiner.*